United States Patent
Boyer et al.

(10) Patent No.: US 12,328,552 B2
(45) Date of Patent: *Jun. 10, 2025

(54) HEARING AID WITH HANDSFREE CONTROL

(71) Applicant: Oticon A/S, Smørum (DK)

(72) Inventors: Eric Boyer, Smørum (DK); Barbara Simon, Berne (CH)

(73) Assignee: OTICON A/S, Smørum (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,539

(22) Filed: May 23, 2024

(65) Prior Publication Data

US 2024/0314505 A1    Sep. 19, 2024

Related U.S. Application Data

(63) Continuation of application No. 17/592,129, filed on Feb. 3, 2022, now Pat. No. 12,028,687.

(30) Foreign Application Priority Data

Feb. 3, 2021  (EP) ..................................... 21155040

(51) Int. Cl.
  *H04R 25/00*  (2006.01)
  *G06F 3/01*  (2006.01)

(52) U.S. Cl.
  CPC ........... *H04R 25/558* (2013.01); *G06F 3/017* (2013.01)

(58) Field of Classification Search
  CPC ........................... H04R 25/558; G06F 3/5175
  See application file for complete search history.

(56) References Cited

U.S. PATENT DOCUMENTS

| 2005/0238190 A1 | 10/2005 | Rohrlein |
| 2011/0242305 A1 | 10/2011 | Peterson et al. |
| 2017/0064432 A1 | 3/2017 | Hviid et al. |
| 2019/0116428 A1 | 4/2019 | Oliaei |

FOREIGN PATENT DOCUMENTS

| EP | 1 424 873 A2 | 6/2004 |
| EP | 1 424 873 A3 | 6/2004 |

OTHER PUBLICATIONS

Extended European Search Report, issued in Priority Application No. 21155040.5, dated Jun. 16, 2021.

*Primary Examiner* — Rasha S Al Aubaidi
(74) *Attorney, Agent, or Firm* — Birch, Stewart, Kolasch & Birch, LLP

(57) ABSTRACT

A hearing aid configured for handsfree control. The hearing aid comprising one or more microphones configured to receive an input signal from the surroundings and a signal processor configured to process the input signal from the surroundings and a receiver configured to emit at least a part of said processed input signal into an ear of a hearing aid user, wherein the signal processor is further configured to process a gestural signal from a user of the hearing aid and make a control change to the hearing aid based on the gestural signal.

16 Claims, 4 Drawing Sheets

HEARING AID WITH HANDSFREE CONTROL

This application is a Continuation of copending application Ser. No. 17/592,129, filed on Feb. 3, 2022, which claims priority under 35 U.S.C. § 119(a) to application Ser. No. 21/155,040.5, filed in Europe on Feb. 3, 2021, all of which are hereby expressly incorporated by reference into the present application.

FIELD

The present disclosure relates to a hearing aid with handsfree control.

BACKGROUND

Generally known hearing aids comprises physical buttons on the hearing aid, which allows the user to control and adjust settings, programs etc. of the hearing aid. However, dexterity is often an issue for the average end-user when controlling the hearing aid, and the functionality which simple button presses can provide access to for a hearing aid user is limited. Furthermore, advanced button presses (quick/long/longer button press) are un-intuitive and complex to learn for especially elderly people and behold with decreased dexterity. These difficulties for accessing the controls can lead to lack of using them, causing a hearing aid user to get less out of what the hearing aid can do for him/her.

Furthermore, hearing aid users often needs to press one or more buttons while wearing the hearing aid and/or to remove the hearing aid from the ear to adjust any setting and/or programs. This can for a hearing aid user be associated with embarrassment and social stigma.

Therefore, there is a need to provide a solution that addresses at least some of the above-mentioned problems. The present disclosure provides alternatives existing solutions.

SUMMARY

According to an aspect the above mentioned challenges are solved by a hearing aid comprising one or more microphones configured to receive an input signal from the surroundings and a signal processor configured to process the input signal from the surroundings. A receiver is configured to emit at least a part of the processed input signal into an ear of a hearing aid user, wherein the signal processor is further configured to process a gestural signal forming part of the input signal and received by the one or more microphones. Further, the processed gestural signal is communicated to a program selector and/or settings processor of the hearing aid, so as to transmit the gestural signal to the program selector and/or settings processor to control a program selection and/or setting of the signal processor of the hearing aid based on the gestural signal. In this way, a user of a hearing aid may control the hearing aid settings and program selection by simply making a gestural movement in close proximity of the hearing aid. The gestural movement will be received by the hearing aid microphones as a part of the input sound signal to the hearing aid and the gestural signal will be subtracted from the original sound signal so as to allow a clean sound transmitted into the ear, while at the same time detecting a command given to the hearing aid by the user. This allow handsfree control of the hearing aid, in that the need for pushing a button physically arranged on the hearing aid is no longer necessary. The processor may further be configured to separate the gestural signal from the sounds received by the microphone in the processing of the sounds in the hearing aid processor. In this way, it is contemplated that when the gestural signal comprises audible sounds, these will not interfere with e.g. speech understanding/speech intelligibility. The user will thus not be disturbed by these sounds originating from the gestural signal.

Several opportunities of handsfree communication with the hearing aid is suggested in the following. They may interact together or be implemented as separate solutions in a hearing aid. Some of the solutions presented may be differentiated into active and passive and others may utilize other means, such as sensors etc. It should be understood that a passive solution is contemplated as a solution having an active hardware component configured to assist in the detection of e.g. gestural signals, whereas an active solution does not require extra components of the hearing aid to work. Both solutions could be contemplated in a hearing aid setup implemented together and as a standalone. A further possibility presented herein is the active use of sensor in the hearing aid and or environment of the user wearing the hearing aid.

In one case of a passive solution, the hearing aid may comprise an ultrasonic emitter configured to emit an ultrasound wave into the surroundings of the hearing aid, and wherein the one or more microphones is configured to receive the ultrasonic wave reflected back from a gesture presented in close proximity to the hearing aid.

In the passive solution using ultrasonic waves, the ultrasonic emitter is configured to emit an ultrasonic wave above 18 kHz and wherein the spatial emission range is configured to cover a pre-defined area of the surroundings to the hearing aid.

The gesture presented by a person wearing the hearing aid may be a hand gesture, wherein a plurality of different hand gestures is configured to control different commands for controlling the program selector and/or settings of the signal processor of the hearing aid.

The signal processor may be configured to detect the velocity and direction of the gesture signal forming part of the input signal to evaluate the change in frequency of the reflected wave in relation to the gesture presented in close proximity to the hearing aid.

The microphone may be configured to also receive sound of the surroundings used in the hearing processing of the hearing aid and emitted to the user for compensating for a hearing loss, wherein the gesture signal is separated, such as subtracted, from the sounds received by the microphone in the processing of the sounds in the hearing aid processor.

The plurality of hand gestures is configured as an "open command" gesture, "volume up", "volume down" and "program choice gesture".

The hearing aid may be configured with a training unit and or to be in communicatively contact with a training unit, wherein the training unit is configured to receive a plurality of different hand gestures for a plurality of different commands of a specific user to train the hearing aid to recognize the plurality of different hand gestures of the user controlling different commands of the hearing aid.

In one case of an active solution the gestural signal may be configured as a sound pattern caused by a movement of an object or hand of a person in close proximity to the hearing aid, wherein the sound pattern is picked up by the one or more microphones and detected by the signal processor, wherein specific sound patterns controls specific commands of the hearing aid, such as program selection and/or a setting in the hearing aid processing.

The sound pattern may be trained in a training unit of the hearing aid to allow the hearing aid to recognize specific sound patterns for specific commands.

In case of both the mentioned passive and active solutions, a detected gestural signal may cause the hearing aid to transmit a pre-defined sound to the hearing aid user indicating execution of a command caused by the gesture signal.

In sensor-based solutions presented herein, especially biometrical sensors have been thought off in view of controlling hearing aids in a handsfree manner.

That is, in an embodiment, the principles behind traditional brain-computer-interfaces to enable seamless brain-hearing instrument-interactions has been thought off in this disclosure. In-ear EEG electrodes embedded in the hearing aid together with a flickering light source installed in the user's environment may allow the user to activate a specific action whenever visually attending the light button.

That is, when looking at a (subtly) flickering light, the brain will automatically entrain to the frequency of the flickering. This frequency is reflected in the recorded EEG signal by the hearing aid, namely through so-called neural entrainment. This response is called visual-evoked potential (VEP). Having the light flicker at above 50 Hz will ensure that it appears as a constant light source and will thus not be perceived as disturbing.

The controls of the hearing aid in any of the described solutions may include for example Volume control/program change.

In the sensor situation, where EEG signals are used, a possibility is to use external LED lights or a screen (could be an app on a phone) flickering at different frequencies. Each frequency may be assigned to different user interactions, enabling the user to control the hearing aid discretely without manually pushing a button. Thus, when a user attends to a specific flickering pattern, the resulting evoked response allows for a change in the hearing aid volume control and/or program change.

In a suggested automatic office mode of the hearing aid, the solution is to bring down the gain only when the hearing aid user is looking at a screen. This would allow the user to focus when you are reading mails, reading and/or are generally working on the computer. However, once you start interacting with colleagues and looking away from the screen your normal optimized settings will be reinstated without the need for explicit user interaction. The flicking of the screen will be reflected in the EEG signal through neural entrainment. While the frequency of the screen is detected, the gain is reduced.

A further situation when being in the so-called office mode may be to ensure that the user can change the settings of the hearing aid without touching the hearing aid by merely looking at a screen in front of the hearing aid user. That is, presenting the user to a screen with a list or a menu with submenus of settings that the user is able to change inside the hearing aid without using his/her hands and giving him/her the knowledge of what setting he is changing to no matter what state the hearing aid is in, provides the user with handsfree control of the hearing aid. The suggested solution is as previously explained to provide the user of the hearing aid with menu items on the screen, where each menu item is configured to blink in specific frequency. Each of the specific frequencies at which the menus are blinking allows the user to selectively look at the flickering menu screen coding for the program or hearing aid setting that the user is interested in. That is, with different menus flickering at different frequencies, it is possible to detect which specific menu item that the users is looking at by measuring his/her EEG signal via the hearing aids and thereby provide the correct settings after some time.

Another setup includes Volume control and TV box control. By adding small diodes with different frequencies to the TV box allows a new form of discrete user interaction. Focusing on the light with a specific frequency would turn up the volume, another frequency would turn it down and a third would allow for pairing the device.

Another setup includes Handsfree alarm button, where a specifically designed alarm button installed in the room of an elderly user may enable users to trigger an emergency call by simply fixating the flickering button for a couple of seconds. This would be ideal for nursery homes or the like, where the help is close by. It could also trigger a 911 call.

Thus, as indicated, different actions may be triggered by the different responses recorded from the visual evoked potential. This also accounts for the gesture situations as would be apparent for a person skilled in the art.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
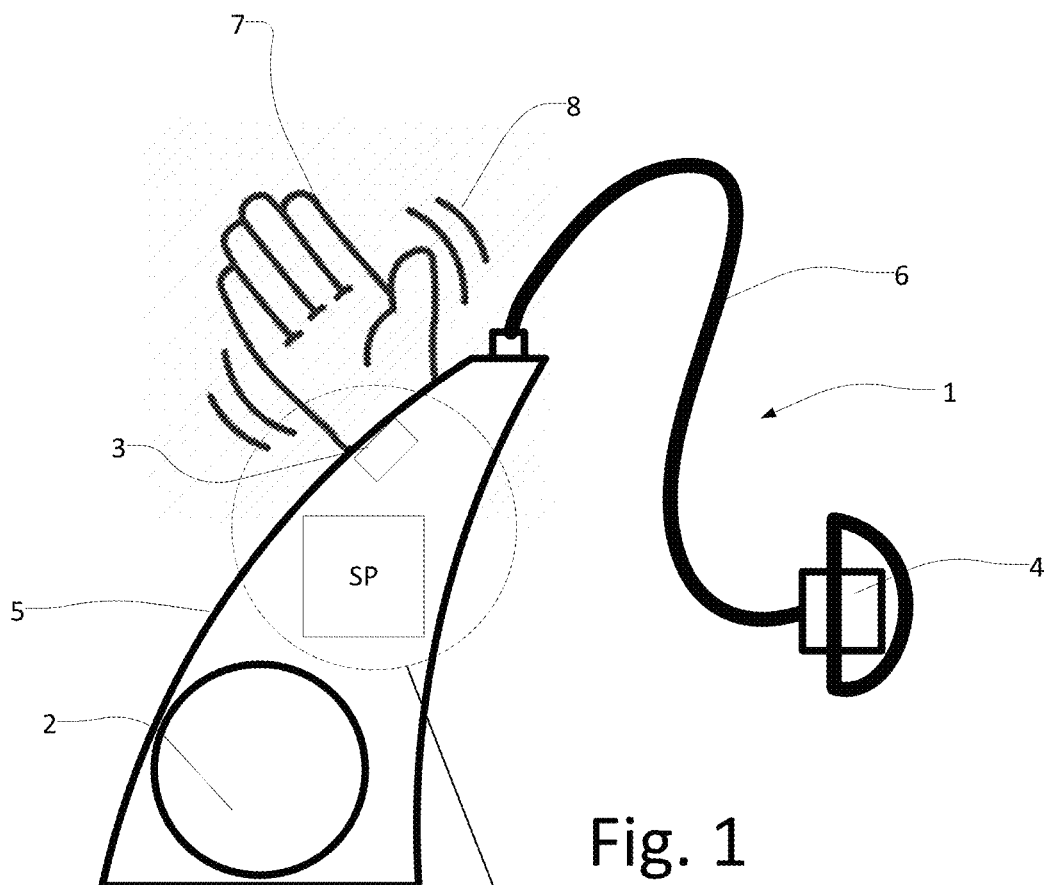
FIG. 1 illustrates a hearing aid configured for handsfree control, where a hand is illustrated to perform a gesture in close proximity to the hearing aid.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing device, such as a hearing aid, is adapted to improve or augment the hearing capability of a user by receiving an acoustic signal (i.e. the input signal) from a user's surroundings, generating a corresponding audio signal, possibly modifying the audio signal and providing the possibly modified audio signal as an audible signal to at least one of the user's ears (i.e. output signal). 'Improving or augmenting the hearing capability of a user' may include compensating for an individual user's specific hearing loss. The "hearing device" may further refer to a device such as a hearable, an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user.

The hearing device is adapted to be worn in any known way. This may include i) arranging a unit of the hearing device behind the ear with a tube leading air-borne acoustic signals into the ear canal or with a receiver/loudspeaker arranged close to or in the ear canal and connected by conductive wires (or wirelessly) to the unit behind the ear, such as in a Behind-the-Ear type hearing aid, and/or ii) arranging the hearing device entirely or partly in the pinna and/or in the ear canal of the user such as in an In-the-Ear type hearing aid or In-the-Canal/Completely-in-Canal type hearing aid, or iii) arranging a unit of the hearing device attached to a fixture implanted into the skull bone such as in a Bone Anchored Hearing Aid or a Cochlear Implant, or iv) arranging a unit of the hearing device as an entirely or partly implanted unit such as in a Bone Anchored Hearing Aid or a Cochlear Implant.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include one or more auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of a remote control, a remote microphone, an audio gateway device, a wireless communication device, e.g. a mobile phone (such as a smartphone) or a tablet or another device, e.g. comprising a graphical interface, a public-address system, a ear audio system or a music player, or a combination thereof. The audio gateway may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals) for transmission to the at least one hearing device. The remote control is adapted to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc.

Now referring to FIG. 1 a hearing aid 1 is illustrated together with a hand performing a gestural movement in close proximity of the hearing aid 1. The hearing aid comprises a battery 2, a signal processor SP, at least one microphone 3 and a receiver 4 together with non-illustrated electrical components of a hearing aid.

The hearing aid illustrated in FIG. 1 is illustrated as a Receiver in the ear (RITE) style hearing aid, where the receiver 4 is intended to be arranged in the ear of a user and connected to a behind the ear part 5 (BTE) of the hearing aid via a connection member 6. It is however emphasized that the illustrated RITE style hearing aid should not be construed as limiting to the current disclosure, since also BTE style hearing aids, CIC style hearing aids, ITE style hearing aids could equally well be implemented with the handsfree control of a hearing aid as described herein. The illustrated given in FIG. 1 is therefore merely for the purpose of illustrating a hearing aid suitable for handsfree control via e.g. a hand 7 of the user of the hearing aid performing a gestural movement resulting in a gestural signal 8.

That is, the hearing aid of FIG. 1 intends to illustrate a hearing aid 1 comprising one or more microphones 3 configured to receive an input signal (not illustrated) from the surroundings. The hearing aid 1 further comprises a signal processor (SP) configured to process the input signal from the surroundings and a receiver 4 configured to emit at least a part of said processed input signal into an ear of a hearing aid user. The signal processor (SP) is further configured to process a gestural signal 8 forming part of the input signal and received by the one or more microphones 3 and to communicate with a program selector and/or settings processor of the hearing aid, so as to transmit the gestural signal 8 to the program selector and/or settings processor to control a program selection and/or setting of the signal processor of the hearing aid based on the gestural signal.

Figure 2:
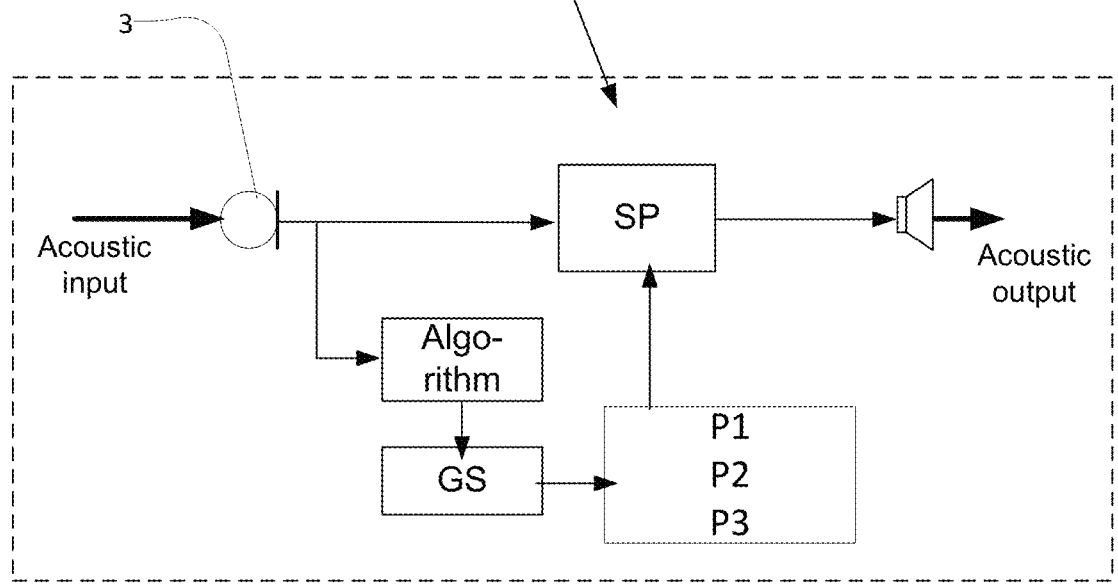
FIG. 2 illustrates the processing of the input signal to the hearing aid together with the separation of the gestural signal from the input signal.

Accordingly, turning now to FIG. 2 showing in more detail the signal processing steps performed by the hearing aid in view of the input signal containing the gestural signal 8. In FIG. 2 it is illustrated how an acoustic input forms the input signal, wherein the acoustic input comprises not only the general sounds from the environment of the hearing aid, but also the gestural signal 8 as explained in relation to FIG. 1. The acoustic input is received by the one or more microphones 3 and it processed so as to subtract the gestural signal (GS) part of the acoustic input. The gestural signal (GS) is analyzed and the classified into a command controlling e.g. a program selection or a hearing aid setting, as indicated as P1, P2, P3 in FIG. 2. The program or setting matching the gestural input will be communicated to the signal processor for adjusting the hearing aid setting and/or action in accordance with the command intended by the gesture provided by a user of the hearing aid and indicated in the recognized gestural signa.

The change to the signal processor may causes several things to happen in the hearing aid. Possibilities have already been mentioned in the disclosure, but includes program selection, volume up, volume down, gain adjustment, turn off hearing aid etc, depending on the situation a user is in and the gesture provided.

By such solution, the user does not need to directly press a button on the hearing aid, but merely needs to present a handsfree gesture to the hearing aid, whereby the hearing aid automatically adjust the program, setting etc. based on the gesture provide by the user.

Figure 3:
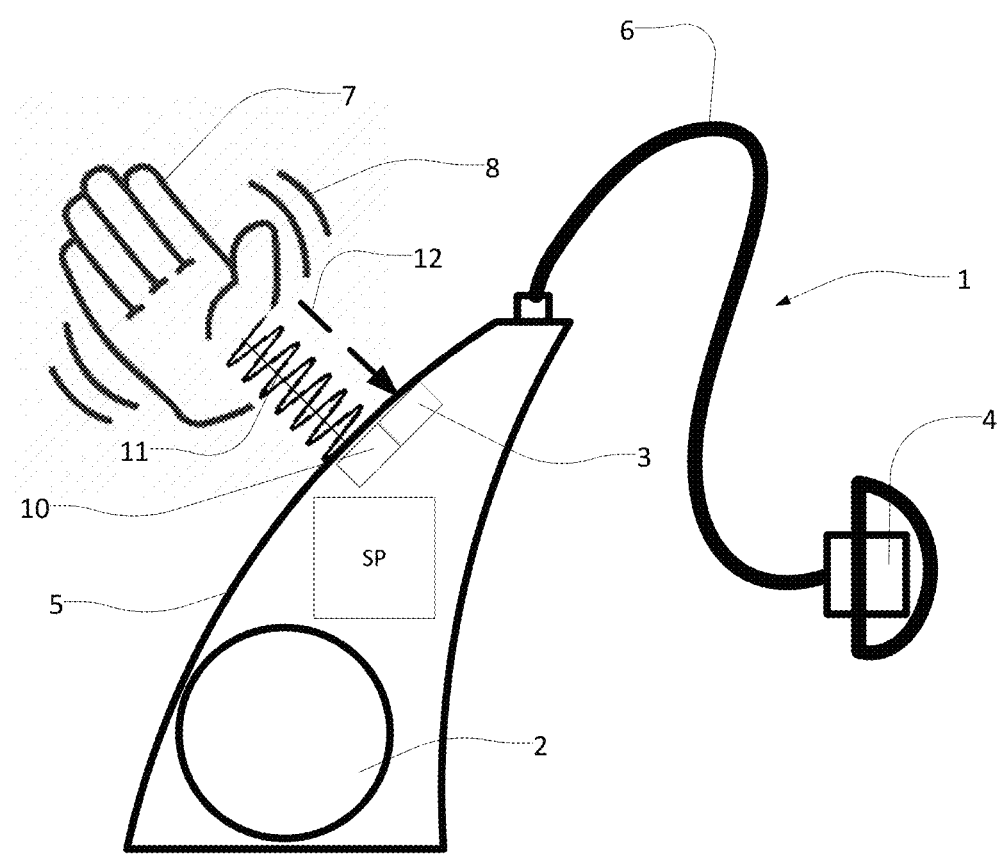
FIG. 3 illustrates an ultrasound emitter setup in a hearing aid for handsfree control.

In an embodiment illustrated in FIG. 3, the hearing aid comprises an ultrasonic emitter 10 configured to emit an ultrasound wave 11 into the surroundings of the hearing aid 1. As previously explained the one or more microphones 3 is configured to receive the reflected ultrasonic wave 12 reflected back from a gesture signal 8 presented in close proximity to the hearing aid. As previously explained, in relation to FIG. 1, the reflected ultrasound wave 12 is also in this embodiment analyzed in the signal processing of the acoustic input and substantially subtracted from the input signal used to compensate for a hearing loss in the signal processor, before emitting the hearing loos compensated output to the user via a receiver 4. This is as previously described considered as a passive solution to handsfree control of a hearing aid.

In the embodiment of FIG. 3, preferably the ultrasonic emitter 10 emits an ultrasonic wave 11 above 18 kHz and wherein the spatial emission range is configured to cover a pre-defined area of the surroundings to the hearing aid As illustrated in FIG. 3, gesture in the surroundings may be a hand gesture 7 of a hearing aid user, and wherein a plurality of different hand gestures is configured to control different commands for controlling the program selector and/or setting of the signal processor of the hearing aid, as explained in relation to FIG. 2.

To detect a specific gesture in the input acoustic signal, the signal processor is configured to detect the velocity and direction of the gesture signal forming part of the input signal to evaluate the change in frequency of the reflected wave in relation to the gesture presented in close proximity to the hearing aid.

In a further embodiment, the hearing aid is configured with a training and/or is configured to be in communicatively contact with a training unit. The training unit is configured to receive a plurality of different hand gestures for a plurality of different commands of a specific user to train the hearing aid to recognize the plurality of different hand gestures of the user controlling different commands of the hearing aid.

Referring again to FIG. 1, the gestural signal 8 may also in one embodiment be configured as a sound pattern caused by a movement of an object or hand 7 of a person in close proximity to the hearing aid. The sound pattern is picked up by the one or more microphones 3 and detected by the signal processor (SP), wherein specific sound patterns controls specific commands of the hearing aid, such as program selection and/or a setting in the hearing aid processing. This is as previously described an active solution to handsfree control of a hearing aid.

As with the passive solution of controlling a hearing aid described herein, also the active solution may be implemented with a training unit configured to allow the hearing aid to better recognize different sound patterns for different commands.

Also in both the mentioned active and passive solutions, the hearing aid is configured such that a detected gestural signal causes the hearing aid to transmit a pre-defined sound to the hearing aid user via the receiver indicating execution of a command caused by the gesture signal.

Figure 4:
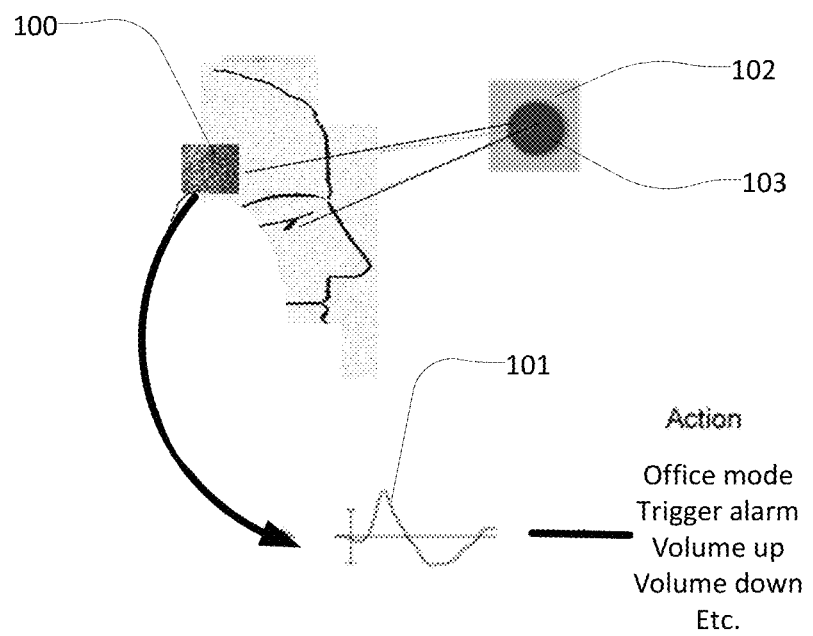
FIG. 4 illustrates an EEG sensor control of a hearing aid.

Referring now to FIG. 4 a handsfree control of a hearing aid using sensors are illustrated. In this embodiment, the hearing aid as illustrated in FIG. 1, is furthermore equipped with one or more EEG sensors configured to record EEG signals from the brain of the hearing aid user. In this embodiment, the EEG signals 100 are used to record a visually evoked potential 101 caused by the hearing aid user looking at an object 102 in the surroundings of the user, wherein that object 102 is equipped with a flickering element, such as LED lights 103 or a screen (could be an app on a phone). The LED 103 of the object is configured to be flickering at different frequencies.

In accordance with this embodiment, each frequency of the flickering LED 103 may be assigned to different user interactions, enabling the user to control the hearing aid discretely without manually pushing a button. Thus, when a user attends to a specific flickering pattern of the LED 103, the resulting evoked response 101 allows for a change in the hearing aid. Such change is illustrated in FIG. 4 as an action including among others: volume control and/or program change, alarm trigger, office mode etc. Several possibilities could be contemplated and is considered to fall within the scope.

In a suggested automatic office mode of the hearing aid, one solution may be to bring down the gain only when the hearing aid user is looking at a screen. This would allow the user to focus when reading mails, reading and/or are generally working on the computer. However, once the user starts to interact with colleagues and looks away from the screen the normal optimized settings will be reinstated without the need for explicit user interaction. That is, the flicking of the screen will be reflected in the EEG signal through neural entrainment, and while the frequency of the screen is detected, the gain is reduced, whereas if no EEG response is detected, it is considered that the hearing aid user is not looking at the screen, and the gain is resumed to normal.

Figure 5:
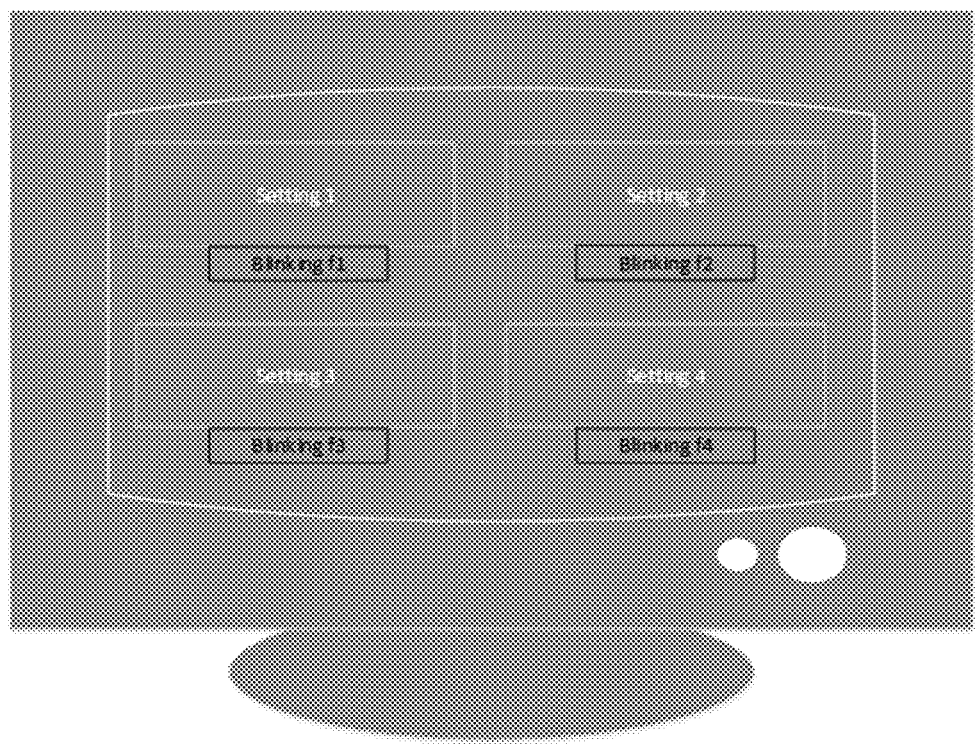
FIG. 5. illustrates an example of an EEG sensor control of a hearing aid.

A further situation when being in office mode may be to ensure that the user can change the settings of the hearing aid without touching the hearing aid by merely looking at a screen in front of the hearing aid user. That is, presenting the user to a screen, as illustrated in FIG. 5, with a list or a menu with submenus of settings (illustrated as setting 1, setting 2, setting 3, setting 4 in FIG. 5) that the user is able to change inside the hearing aid without using his/her hands and giving him/her the knowledge of what setting he is changing to no matter what state the hearing aid is in, provides the user with handsfree control of the hearing aid. As illustrated in FIG. 5, each of the menu item is configured to blink in specific frequency, where each of the specific frequencies at which the menus are blinking allows the user to selectively look at the flickering menu screen coding for the program or hearing aid setting that the user is interested in. This will cause different visual evoked potentials due to the different frequencies of flickering, and the hearing aid will thereby be able to differentiate between the menus looked at by the user. Thus, it is possible to detect which specific menu item that the user is looking at by measuring his/her EEG signal via the hearing aids and thereby provide the correct settings after some time.

Other examples of use have previously been described and will therefore not be elaborated on in further detail. Furthermore, it is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items.

The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

The invention claimed is:

1. A hearing aid comprising
a signal processor configured to process an input signal; and
an ultrasonic emitter configured to emit an ultrasound wave into the surroundings of the hearing aid,
wherein the signal processor is configured to process a gestural signal, which forms part of the input signal and is received by one or more microphones, and to communicate with a program selector and/or settings processor of the hearing aid so as to transmit the gestural signal to the program selector and/or settings processor to control a program selection and/or setting of the signal processor of the hearing aid based on the gestural signal, and
wherein the one or more microphones is configured to receive the ultrasonic wave reflected back from a gesture presented in close proximity to the hearing aid.

2. The hearing aid according to claim 1, wherein the processor is configured to separate the gestural signal from the sounds received by the microphone in the processing of the sounds in the hearing aid processor.

3. The hearing aid according to claim 2, wherein the separation of the gestural signal from the sounds received by the microphone is a subtraction.

4. The hearing aid according to claim 1, wherein the gesture in the surroundings is a hand gesture of a hearing aid user, and wherein a plurality of different hand gestures is configured to control different commands for controlling the program selector and/or setting of the signal processor of the hearing aid.

5. The hearing aid according to claim 4 wherein a plurality of hand gestures is configured as one of "volume up," "volume down," and program choice gesture.

6. The hearing aid according to claim 5, wherein a detected gestural signal causes the hearing aid to transmit a pre-defined sound to the hearing aid user indicating execution of a command caused by the gesture signal.

7. The hearing aid according to claim 4, wherein a detected gestural signal causes the hearing aid to transmit a pre-defined sound to the hearing aid user indicating execution of a command caused by the gesture signal.

8. The hearing aid according to claim 1, wherein the hearing aid is configured with a training unit and/or to be in communicative contact with a training unit, wherein the training unit is configured to receive a plurality of different hand gestures for a plurality of different commands of a specific user to train the hearing aid to recognize the plurality of different hand gestures of the user controlling different commands of the hearing aid.

9. The hearing aid according to claim 8, wherein a detected gestural signal causes the hearing aid to transmit a pre-defined sound to the hearing aid user indicating execution of a command caused by the gesture signal.

10. The hearing aid according to claim 1, wherein a detected gestural signal causes the hearing aid to transmit a pre-defined sound to the hearing aid user indicating execution of a command caused by the gesture signal.

11. The hearing aid according to claim 1, wherein a detected gestural signal causes the hearing aid to transmit a pre-defined sound to the hearing aid user indicating execution of a command caused by the gesture signal.

12. The hearing aid according to claim 1, wherein
the ultrasonic emitter emits an ultrasonic wave above 18 kHz, and
a spatial emission range is configured to cover a pre-defined area of the surroundings to the hearing aid.

13. A hearing aid comprising
a signal processor configured to process an input signal,
wherein the signal processor is configured to process a gestural signal, which forms part of the input signal and is received by one or more microphones, and to communicate with a program selector and/or settings processor of the hearing aid so as to transmit the gestural signal to the program selector and/or settings processor to control a program selection and/or setting of the signal processor of the hearing aid based on the gestural signal,
wherein the gestural signal is configured as a sound pattern caused by a movement of an object or hand of a person in close proximity to the hearing aid, wherein the sound pattern is picked up by the one or more microphones and detected by the signal processor, and
wherein specific sound patterns controls specific commands of the hearing aid, such as program selection and/or a setting in the hearing aid processing.

14. The hearing aid according to claim 13, the sound pattern is trained in a training unit of the hearing aid.

15. The hearing aid according to claim 14, wherein a detected gestural signal causes the hearing aid to transmit a pre-defined sound to the hearing aid user indicating execution of a command caused by the gesture signal.

16. The hearing aid according to claim 13, wherein a detected gestural signal causes the hearing aid to transmit a pre-defined sound to the hearing aid user indicating execution of a command caused by the gesture signal.

* * * * *